(12) United States Patent
Mehrvar

(10) Patent No.: US 11,838,102 B2
(45) Date of Patent: Dec. 5, 2023

(54) METHOD AND SYSTEMS FOR OPTICAL NETWORK DIMENSIONING

(71) Applicant: HUAWEI TECHNOLOGIES CO., LTD., Shenzhen (CN)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

(21) Appl. No.: 17/525,026

(22) Filed: Nov. 12, 2021

(65) Prior Publication Data

US 2023/0155713 A1     May 18, 2023

(51) Int. Cl.
*H04J 14/02*     (2006.01)
*H04B 10/2507*     (2013.01)

(52) U.S. Cl.
CPC ...... *H04J 14/0212* (2013.01); *H04B 10/2507* (2013.01)

(58) Field of Classification Search
CPC ............. H04J 14/0212; H04B 10/2507
See application file for complete search history.

(56) References Cited

U.S. PATENT DOCUMENTS

| | | | | | |
|---|---|---|---|---|---|
| 5,572,517 A | * | 11/1996 | Safadi | ............... | H04L 69/329 348/E5.006 |
| 5,600,466 A | * | 2/1997 | Tsushima | ............ | H04J 14/0283 398/58 |
| 5,717,795 A | * | 2/1998 | Sharma | ............... | H04J 14/0212 398/91 |
| 9,654,248 B2 | * | 5/2017 | Wright | ............... | H04J 14/0257 |
| 2003/0011846 A1 | * | 1/2003 | Gholamhosseini | .. | H04Q 3/0083 398/98 |
| 2003/0189933 A1 | * | 10/2003 | Ozugur | ................... | H04L 45/10 370/395.1 |

(Continued)

FOREIGN PATENT DOCUMENTS

| | | |
|---|---|---|
| CN | 108881047 A | 11/2018 |
| CN | 112152935 A | 12/2020 |

(Continued)

OTHER PUBLICATIONS

Wang, M. et al., "Blocking Probability Analysis of Circuit-Switched Networks With Long-Lived and Short-Lived Connections," J. Opt. Commun. Netw. vol. 5, No. 6, pp. 621-640 (2013).

(Continued)

*Primary Examiner* — Tanya T Motsinger

(57) ABSTRACT

A method to select a number of fibers for ROADM-equipped nodes of an optical network by which a controller is operative to determine which links are utilized as well as their usage frequencies and then partition a scale of usage frequencies into a number of intervals. By assigning a number of fibers to each one of the intervals, a number of fibers is assigned to each link, according to their usage frequencies, setting the degree for ROADMs at the nodes. Simulations can evaluate the network's performance in terms of a blocking rate representing an overall signal blocking rate by the ROADMs at network nodes. The number of intervals, their ranges, and the number of fibers associated with each interval can be iterated until an improved or satisfactory network performance is achieved.

21 Claims, 13 Drawing Sheets

(56) References Cited

U.S. PATENT DOCUMENTS

| | | | | |
|---|---|---|---|---|
| 2004/0162718 | A1* | 8/2004 | Watkins | H04L 41/145 703/21 |
| 2007/0253341 | A1* | 11/2007 | Atkinson | H04L 45/02 370/252 |
| 2009/0060505 | A1* | 3/2009 | Bernstein | H04Q 11/0062 398/48 |
| 2009/0060512 | A1* | 3/2009 | Bernstein | H04J 14/0246 398/79 |
| 2009/0148162 | A1* | 6/2009 | Tang | H04Q 11/0066 398/48 |
| 2012/0114282 | A1* | 5/2012 | Grover | H04J 14/0284 385/16 |
| 2012/0237217 | A1* | 9/2012 | Spivey | H04J 14/0247 398/48 |
| 2015/0131991 | A1* | 5/2015 | Hattori | H04Q 11/0005 398/47 |
| 2016/0241353 | A1* | 8/2016 | Wright | H04J 14/0256 |
| 2016/0330083 | A1* | 11/2016 | Djukic | H04L 12/1492 |
| 2018/0123724 | A1* | 5/2018 | Zhang | H04J 14/0257 |
| 2020/0305137 | A1* | 9/2020 | Lu | H04W 72/04 |
| 2022/0006741 | A1* | 1/2022 | Fiaschi | H04L 47/12 |
| 2022/0103263 | A1* | 3/2022 | Froc | H04B 10/572 |
| 2022/0200894 | A1* | 6/2022 | Carnes, III | H04L 45/24 |
| 2022/0216916 | A1* | 7/2022 | Compann | H04B 10/0731 |
| 2023/0155713 | A1* | 5/2023 | Mehrvar | H04J 14/0212 398/83 |
| 2023/0205152 | A1* | 6/2023 | Mandal | G06Q 10/06316 700/275 |

FOREIGN PATENT DOCUMENTS

| | | |
|---|---|---|
| JP | 2005086303 A | 3/2005 |
| JP | 2011004294 A | 1/2011 |
| WO | 2015010654 A1 | 1/2015 |

OTHER PUBLICATIONS

Jara, N. et al., "Blocking Evaluation and Wavelength Dimensioning of Dynamic WDM Networks without Wavelength Conversion," Journal of Optical Communications and Networking, Piscataway, NJ ; Washington, DC : IEEE : Optical Society of America, 2017, 9 (8), pp. 625-634, 10.1364/JOCN.9.000625. hal-01663506.

Palacharla, P. et al., "Blocking performance in dynamic optical networks based on colorless, non-directional ROADMs," 2011 Optical Fiber Communication Conference and Exposition and the National Fiber Optic Engineers Conference, 2011, pp. 1-3.

* cited by examiner

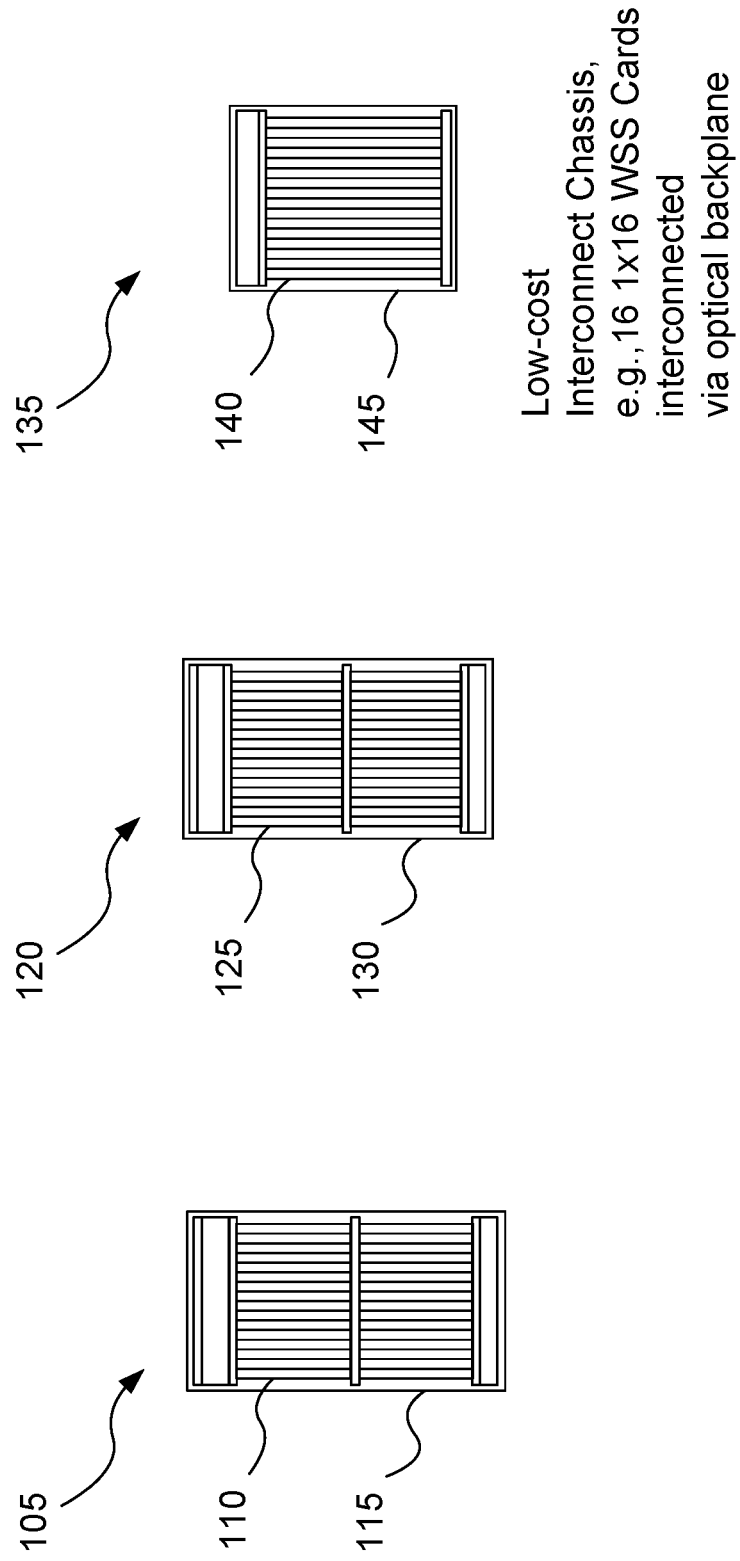

METHOD AND SYSTEMS FOR OPTICAL NETWORK DIMENSIONING

CROSS-REFERENCE TO RELATED APPLICATIONS

This is the first application filed for the present invention.

TECHNICAL FIELD OF THE INVENTION

This invention pertains generally to the field of optical communications and in particular, to systems and methods for optimizing the number of fibers on links of an optical network.

BACKGROUND

A reconfigurable optical add-drop multiplexer (ROADM) is an optical node that can add, block, pass or redirect light signals of various wavelengths in a fiber optic network. ROADMs can be used in systems employing wavelength division multiplexing (WDM) to allow data traffic modulated on a wavelength to be added at a source node and then passed through one or many ROADM nodes before being dropped at a destination node. The destination node can then de-modulate the light signal and decode the data into electronic bits. A ROADM can play a key role in the switching and transport of high volumes of data. The ROADM can be characterized by two parameters: its degree, which is the number of fibers the ROADM connects to, and the number of different wavelengths it can add or drop at a given node.

Each fiber can carry a predetermined number of wavelengths. For example, for the international telecommunication union's (ITU) 50 GHz fixed grid, it is typically 80 wavelengths. In the absence of wavelength conversion at a ROADM node, a signal of a certain wavelength in a fiber going in one direction, can be dropped, or switched to a signal of the same wavelength going in another direction.

Typically, a single ROADM node chassis can be a 16-slot chassis or a 32-slot chassis. For instance, a 32-slot chassis interconnecting all the slots via an optical backplane can be configured as an 8-degree ROADM with 8 single-slot line cards, each slot equipped with 1×32 twin-WSS (one for an input fiber of a direction and the other for an output fiber in the same direction) cards, and 12 double-width add/drop cards, where "degree" refers to the number of fibers in and out of a ROADM. An add/drop rate can depend on the design. For example, on an 80-wavelength ITU 50 GHz grid, with 24 ports per add/drop card, an add/drop rate can be 45%. If a 32-slot chassis is deployed as a 16-degree ROADM, 16 slots can be used as line cards and the remaining 16 slots can be used for 8 add/drop cards, resulting in a 15% add/drop rate.

Limitations exist, however, in both scaling and flexibility of an add/drop rate deployment. Furthermore, in response to traffic growth, fibers or degrees in a ROADM are typically added to the network in a reactive manner; however, this does not guarantee an optimized utilization of resources.

Therefore, there is a need for methods and systems to provide scaling, flexibility, and an efficient use of network resources, as traffic and network use increase, and such would obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention address the issue of optimizing utilization of network resources, while allowing more scalability and flexibility in add/drop rate deployments. Instead of adding fibers and ROADM degrees in a reactive manner according to increases in demand and traffic, fibers and ROADM degrees can be added proactively, based on performance results of the network as a whole, or on a simulated network.

In a method according to an embodiment, one or more nodes of a network are equipped with respective ROADMs, and the degree of each ROADM can be assigned using a systematic approach. Once a controller of the network has determined the utilized paths of the network, and the links forming the paths, the links' utilization frequencies can be determined as well. A scale of utilization frequencies can be partitioned into intervals having the same or different ranges, and a number of fibers can be assigned to each interval. A simulation of the re-assigned network can be performed in order to evaluate its performance as updated, and then the number of intervals, their ranges, and the number of fibers assigned to each interval can be iterated or incremented to simulate a new configuration. Following a plurality of simulations and respective performance results, optimized numbers for the amount of intervals, their ranges, and the number of fibers in each interval can be obtained, and a physical network that is simulated can be re-configured accordingly.

To illustrate the technical effects of embodiments, a comparison can be made with a method of the prior art. The nodes of a network are equipped with ROADMs that don't all necessarily have direct connections to all other ROADMs. As a result, by simply scaling with traffic the number of fibers on each link of the network, the overall blocking rate of a fully loaded network, when the add/drop rate of each ROADM is 100%, can remain high say at 50%. This blocking can occur when all the add sources of the network's ROADMs attempt to connect to the drop ports of other ROADMs, i.e. if all available ROADM add port transponders try to connect to the available ROADM drop port transponders and the network resources are limited. However, with a method according to embodiments, a network's overall signal blocking rate can be lowered to much less than 50%, such as 30%. This can significantly increase network resource utilization, in that for a number of fibers in a network, a more efficient utilization of its components can be achieved.

Embodiments include a method of optimizing a network's efficiency with a network controller, comprising: determining for each path of the network, which links are utilized; determining for each utilized link, the link's usage frequency in at least one direction; quantizing a scale of link usage frequency into a number of intervals; and assigning to each interval a number of fibers.

In embodiments, quantizing a scale of link usage frequency into a number of intervals can include partitioning the scale of link usage frequency into a number of intervals, and assigning a range to each interval.

In embodiments, assigning to each interval a number of fibers can result in assigning a number of fibers to each utilized link, and assigning a number of fiber connections to one or more utilized reconfigurable optical add-drop multiplexers (ROADM) located at respective nodes of the network.

In embodiments, updating in a network the numbers of fiber connections of ROADMs, can be performed according to the numbers of fiber connections they have been assigned; and evaluating performance results of the network having ROADMs with updated numbers of fiber connections.

In embodiments, a network can be a simulated network.

In embodiments, a method can include iterating the quantizing of a scale of link usage frequency into a number of intervals, until one or more criteria of performance results are achieved.

In embodiments, a method can further include iterating the assigning to each interval a number of fibers, until one or more criteria of performance results are achieved.

In embodiments, assigning to each interval a number of fibers can be based on iterating the quantizing of a scale of link usage frequency into a number of intervals, and on one or more criteria of performance results being achieved.

In embodiments, the performance results can include a blocking rate representing an overall signal blocking rate of the network, and the one or more criteria can include the blocking rate.

In embodiments, determining which links are utilized, and determining the link's usage frequency can be based on network level link utilization and routing information.

In embodiments, determining which links are utilized, and determining the link's usage frequency can be based on one or more physical parameters and a link budget.

In embodiments, a physical parameter can be one of: an optical signal-to-noise-ratio (OSNR), a physical medium dependent (PMD) parameter, a polarization mode dispersion parameter (PMD), a differential group delay (DGD) parameter, a polarization loss (PDL) parameter, and a cross-phase modulation (XPM) parameter.

Embodiments include a system for optimizing the efficiency of an optical network comprising a controller operative to determine for each path of the network, which links are utilized; determine for each utilized link, the link's usage frequency in at least one direction; quantize a scale of link usage frequency into a number of intervals; and assign to each interval, a number of fibers.

In embodiments, a system can further include one or more reconfigurable optical add-drop multiplexers (ROADM) located at respective nodes of the network, and a controller can be further operative to assign a number of fibers to each utilized link, and assign a number of fiber connections to one of more utilized ROADMs; based on the number of fibers assigned to each interval.

In embodiments, at least one reconfigurable ROADM can be operative to have its degree updated by changing how many wavelength selective switches (WSS) it contains.

In embodiments, a controller can be further operative to evaluate performance results of the network in which the degree of at least one ROADM has been updated.

In embodiments, a controller can be further operative to iterate the quantizing of a scale of link usage frequency into a number of intervals, until one or more criteria of performance results are achieved.

In embodiments, a controller can be further operative to iterate the range of one of more intervals until one or more criteria of performance results are achieved.

In embodiments, a controller can be further operative to iterate the assignment to each interval, of a number of fibers until one or more criteria of performance results are achieved.

In embodiments, a controller can be further operative to select the number of intervals, and the numbers of fibers, based on iterations until one or more criteria of performance results are achieved.

In embodiments performance results can include a blocking rate representing an overall signal blocking rate of the network.

BRIEF DESCRIPTION OF THE DRAWINGS

FIG. 1a illustrates a line chassis (LC), according to embodiments.

FIG. 1b illustrates an add/drop chassis (ADC), according to embodiments.

FIG. 1c illustrates a low-cost interconnect chassis (IC), according to embodiments.

It will be noted that throughout the appended drawings, like features are identified by like reference numerals.

DETAILED DESCRIPTION

Figure 1D:
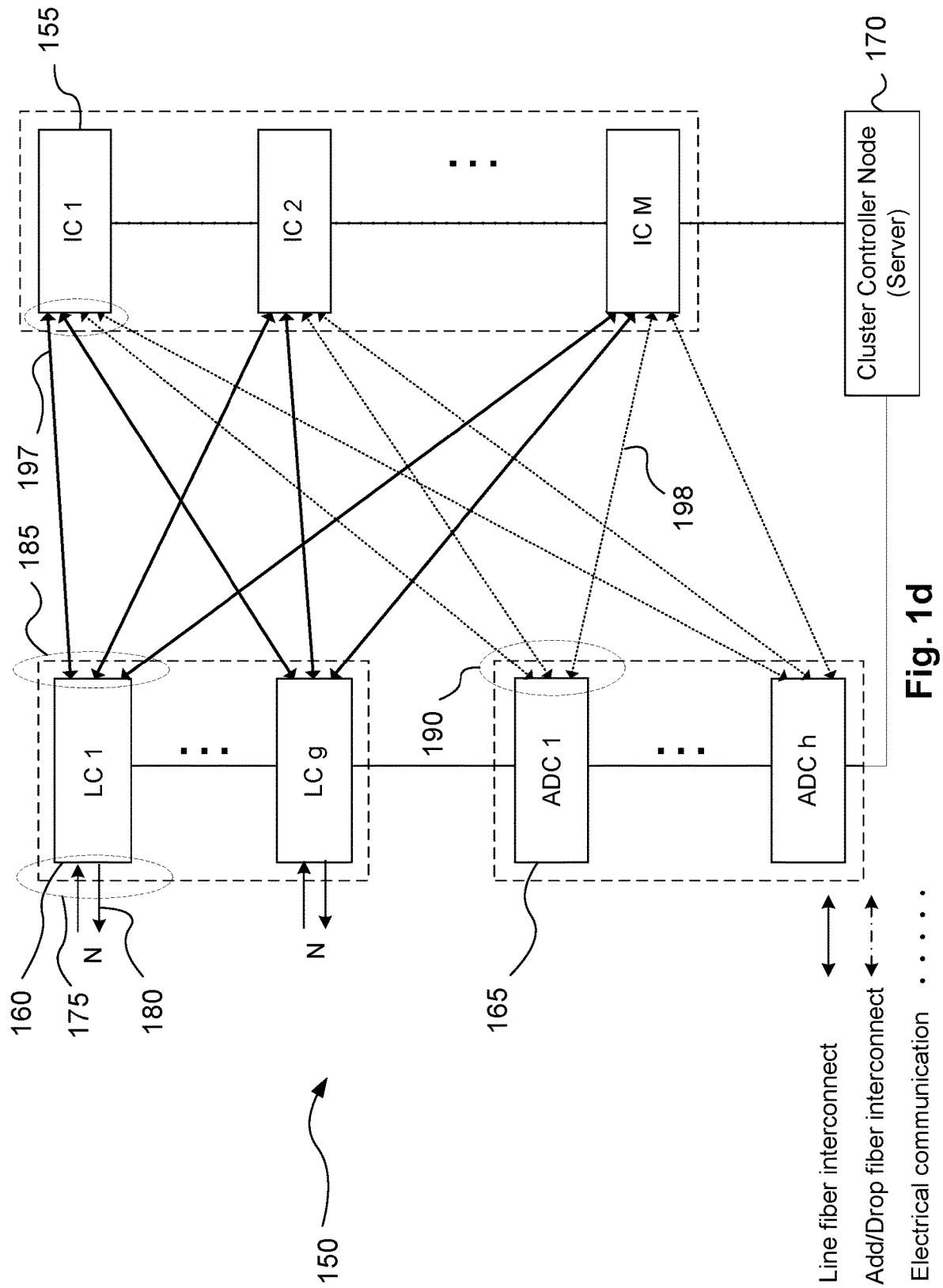
FIG. 1d illustrates an example of a ROADM cluster node, according to an embodiment.

Embodiments of the present invention address the issue of optimizing utilization of network resources, while allowing scalability and flexibility in add/drop rate deployments.

In embodiments, a ROADM is a low-cost cluster node that can be constructed using existing chassis, in order to allow re-usability, and it can be designed with enough flexibility to offer a carrier the option to pay for additional capacity as needed.

A ROADM cluster node can include components allowing low-cost and scalable solutions for ROADM nodes. A ROADM cluster node can consist of a Line Chassis (LC), an Add/Drop Chassis (ADC) and an Interconnect Chassis (IC). In a cluster ROADM node according to an embodiment, line and add/drop functions of a single ROADM chassis node can be separated in a cluster ROADM node.

FIG. 1a illustrates a line chassis (LC), according to embodiments. An LC 105 can include 32 slots 110, interconnected via an optical backplane 115.

FIG. 1b illustrates an add/drop chassis (ADC), according to embodiments. An ADC 120 can include add/drop card connectivity to inter-connect cards 125 via an optical backplane 130.

FIG. 1c illustrates a low-cost interconnect chassis (IC), according to embodiments. An IC 135 can include sixteen 1×16 WSS Cards 140 interconnected via optical backplane 145.

In an embodiment, a LC and an ADC can each have a 32 slots chassis, and an IC 135 can have 16 slots. By equipping an LC with thirty-two 1×32 twin-WSS cards, interconnected with an optical backplane, an LC can function as a 32×32 WSS. The ADC can be equipped to add/drop cards and interconnect cards. Similarly, an IC 135 can be equipped with sixteen 1×16 twin-WSS, interconnected via an optical backplane 145. An IC should be low-cost, because it is common equipment interconnecting LCs and ADCs in a ROADM cluster node. By having an LC and an ADC separated, a cluster node's degree can be increased and a flexible add-drop rate ranging from 0% to 100% can be provided. Also, separation between LC and ADC can allow usage of an existing chassis for future scaling and growth capability, while minimizing investment losses.

FIG. 1d illustrates an example of a ROADM cluster node, according to an embodiment. A ROADM cluster node 150 can include M interconnect chassis (IC) 155 each one interconnecting a number g of line chassis (LC) 160, to a number h of add/drop chassis (ADC) 165. It can also include a cluster controller 170 configured to control the operation of the cluster ROADM node through communications with their respective chassis controllers. Each LC 160 can include N line cards 175 for N incoming and outgoing fibers 180 of the cluster node and M interconnect cards 185. Each ADC 165 can also include M interconnect cards 190, and remaining cards can be add-drop ports. Each IC can have S interconnect cards 195 for interconnecting the LCs 160 and ADCs 165, where:

$S=g+h$

Each interconnect card of an LC 160 connects via fiber 197 to an IC 155. Similarly, each of the M interconnect cards 190 of the ADCs 165 can connect via fiber 198 to an IC 155. The total number of WSS cards supported by an LC is M+N, which can be 32. Similarly, the total number of interconnect cards supported by each of the M low-cost ICs, is S=g+h, which can be S=16. The total degree of the ROADM cluster node can be g*N.

The add-drop rate of a ROADM cluster can be determined with the parameter h and subsequently, with the number of add/drop ports on each slot of an ADC. The selection of appropriate values for M and N can have an impact on both cost and performance. In a 3-stage non-blocking Clos architecture, the relationship between M and N can be:

$M \geq 2N-1$

As this selection results in more typical equipment costs (e.g., N=11 and M=21) and a smaller number of degrees (176 degree for h=0), in an embodiment, N and M can be selected such that:

$N < M \leq 1.3*N$

The selection of N and M can impact blocking performance and in an embodiment, a blocking rate better than $10^{-4}$ can be obtained by using an order-based method. Table 1 shows examples of cluster node sizes for N=14 and M=18, that offer scaling and cost benefits in comparison with a Clos architecture.

TABLE 1

Cluster node sizes for an embodiment where
N = 14, and M = 18

| | Embodiment where: N = 14 (line cards) and M = 18 (interconnect cards) | | | | |
|---|---|---|---|---|---|
| | g = 8<br>h = 8 | g = 10<br>h = 6 | g = 12<br>h = 4 | g = 14<br>h = 2 | g = 16<br>h = 0 |
| Degree | 112 | 140 | 168 | 196 | 224 |
| Add/Drop | 100% | 60% | 33% | 14% | 0% |

As traffic increases, the capacity of a network node can increase and additional fibers can be utilized between the network nodes.

Figure 2:
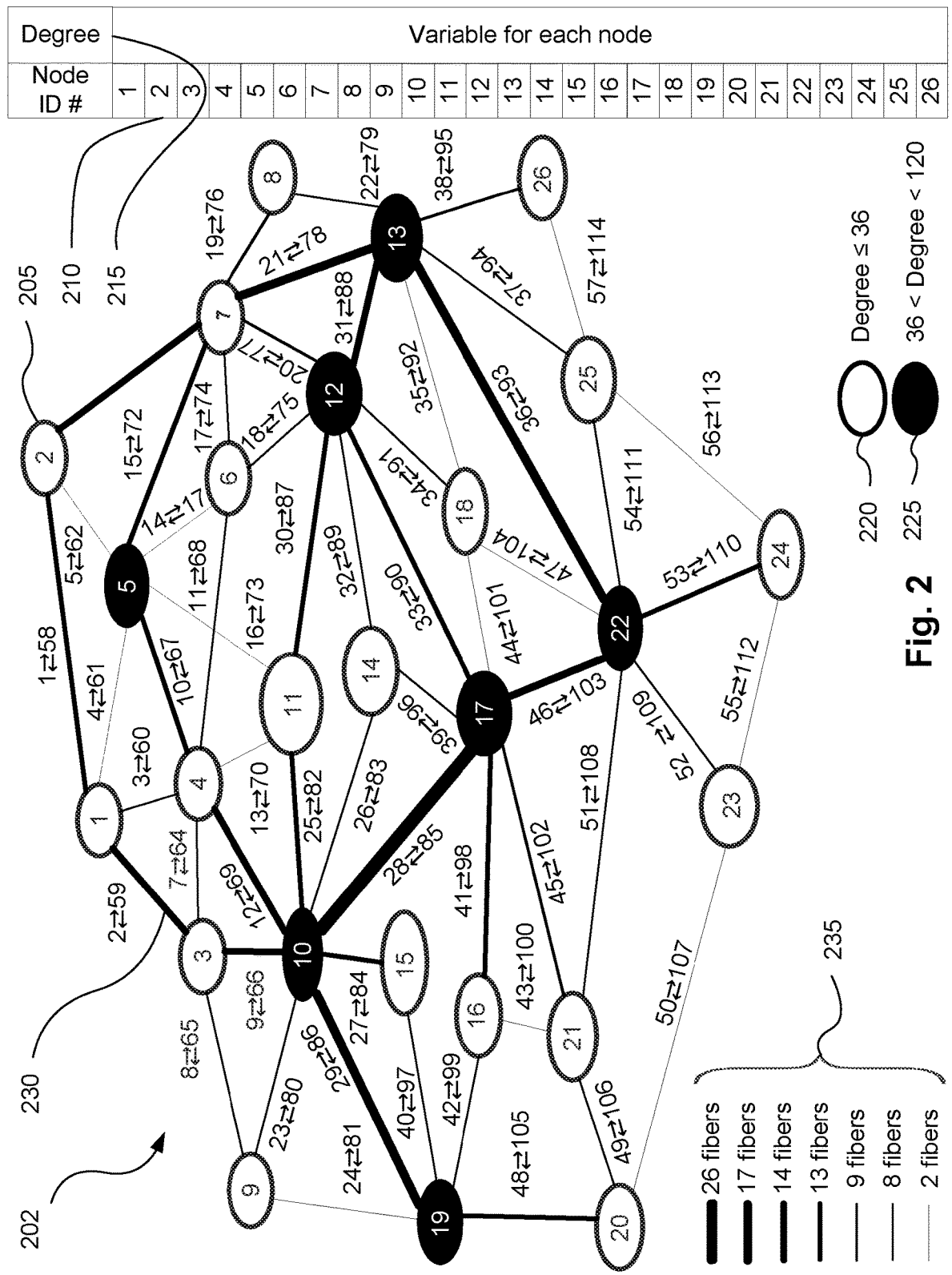
FIG. 2 illustrates an example of a network with 26 nodes and 57 bidirectional links, or 114 unidirectional links, according to an embodiment.

FIG. 2 illustrates an example of a network with 26 nodes and 57 bidirectional links, or 114 unidirectional links, according to an embodiment. Each node of a network 202 can be a ROADM node 205, it can be identified with an identification (ID) number 210 of the network and it can be connected to a number of fibers, the number referred to as a degree 215 of the node. The degree of each node 205 can be variable. For example, it can be a function how many fibers it is connected to. In an example, nodes can be classified according to their degree. In FIG. 2 for example, white nodes 220 have a degree of less than 36, and black nodes 225 have a degree between 36 and 120. In an embodiment, the degree of each node can be determined in order to optimize a network's performance.

In the network of FIG. 2, each link 230 can propagate a signal in either of two directions, and therefore, it can be identified with either of two ID numbers, one for either direction. For example, the link 230 connecting node 1 to node 3 can be identified with ID number 2 for a signal going in one direction, and with ID number 59 for a signal going in the opposite direction, i.e. with "2⇆59". Also, each bidirectional link can include more than one fiber, as indicated by the thickness 235 of its representative line. For example, according to the key 235, link "2⇆59" 230 includes 2 fibers.

To efficiently deploy high-degree ROADMs in an optical network, in response to traffic growth, a fiber (or, in a head-and-tail ROADM, a degree) can be added to a network in a reactive manner, as demand increases. However, this cannot guarantee a better utilization of network resources.

Figure 3:
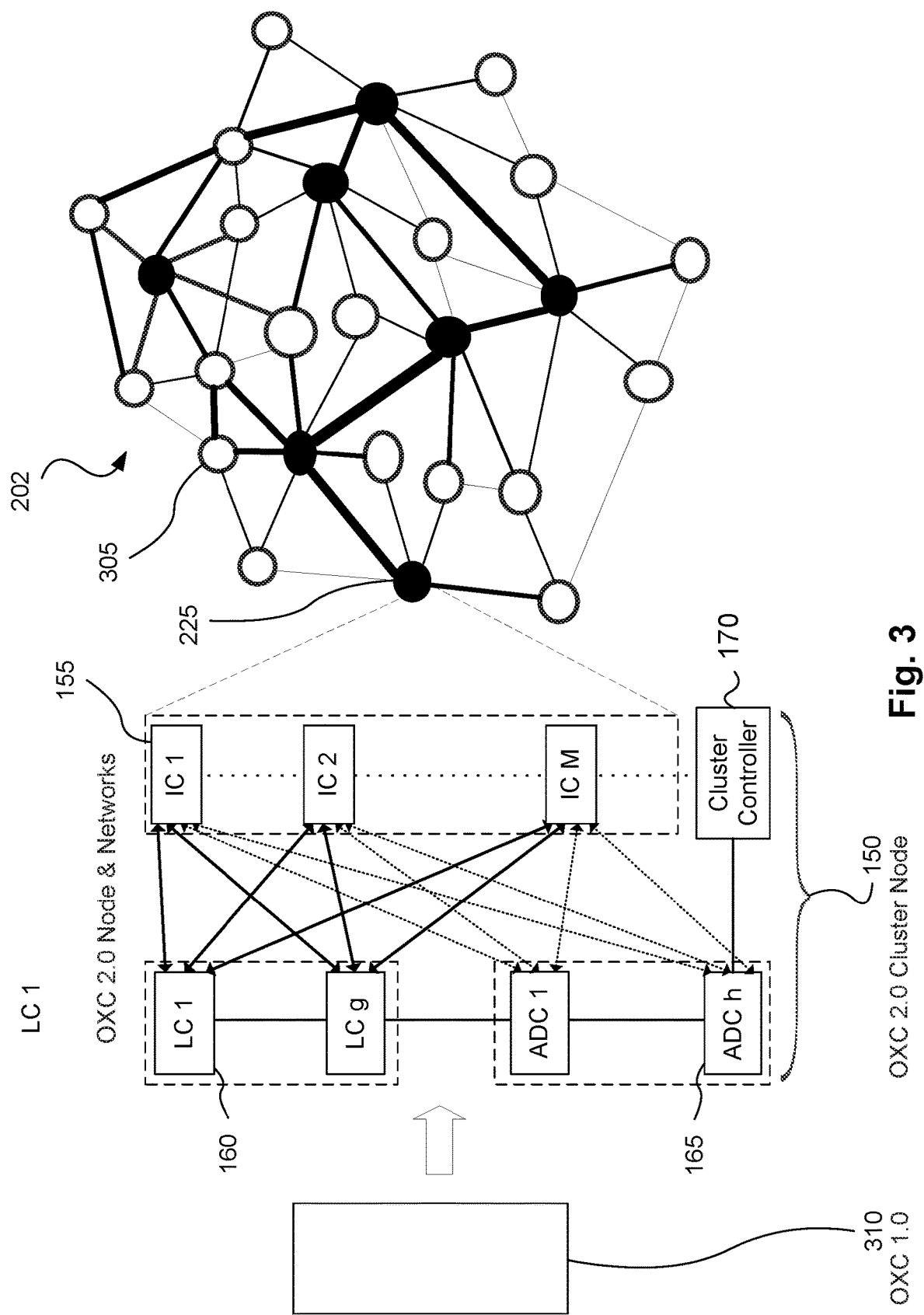
FIG. 3 illustrates a network in which each high-degree node hosts a ROADM cluster node, according to an embodiment.

FIG. 3 illustrates a network 202 in which each high-degree node 225 is a ROADM cluster node, according to an embodiment. In an example, each node 305 can perceive the same traffic growth, and the same traffic load can be received and delivered from each node 305 to the others 305. Instead of an optical cross-connect (OXC 1.0) 310 of some prior art, a ROADM cluster node OXC 2.0 150 can be present at nodes having a higher degree 225, and their degrees can be selected with pro-active network planning according to embodiments.

Embodiments include methods to determine and attain an optimum degree and/or an optimum number of fibers at each link, such that the overall end-to-end wavelength connection blocking through the network of ROADMs can be minimized and utilization can be maximized. Embodiments further include methods to increase utilization of network resources.

As a comparison reference, if, in response to traffic growth, the same number of fibers is added to all the 57 links of the network 202 in FIG. 2 (or FIG. 3), a blocking probability can be obtained, and this can be shown in a graph.

Figure 4:
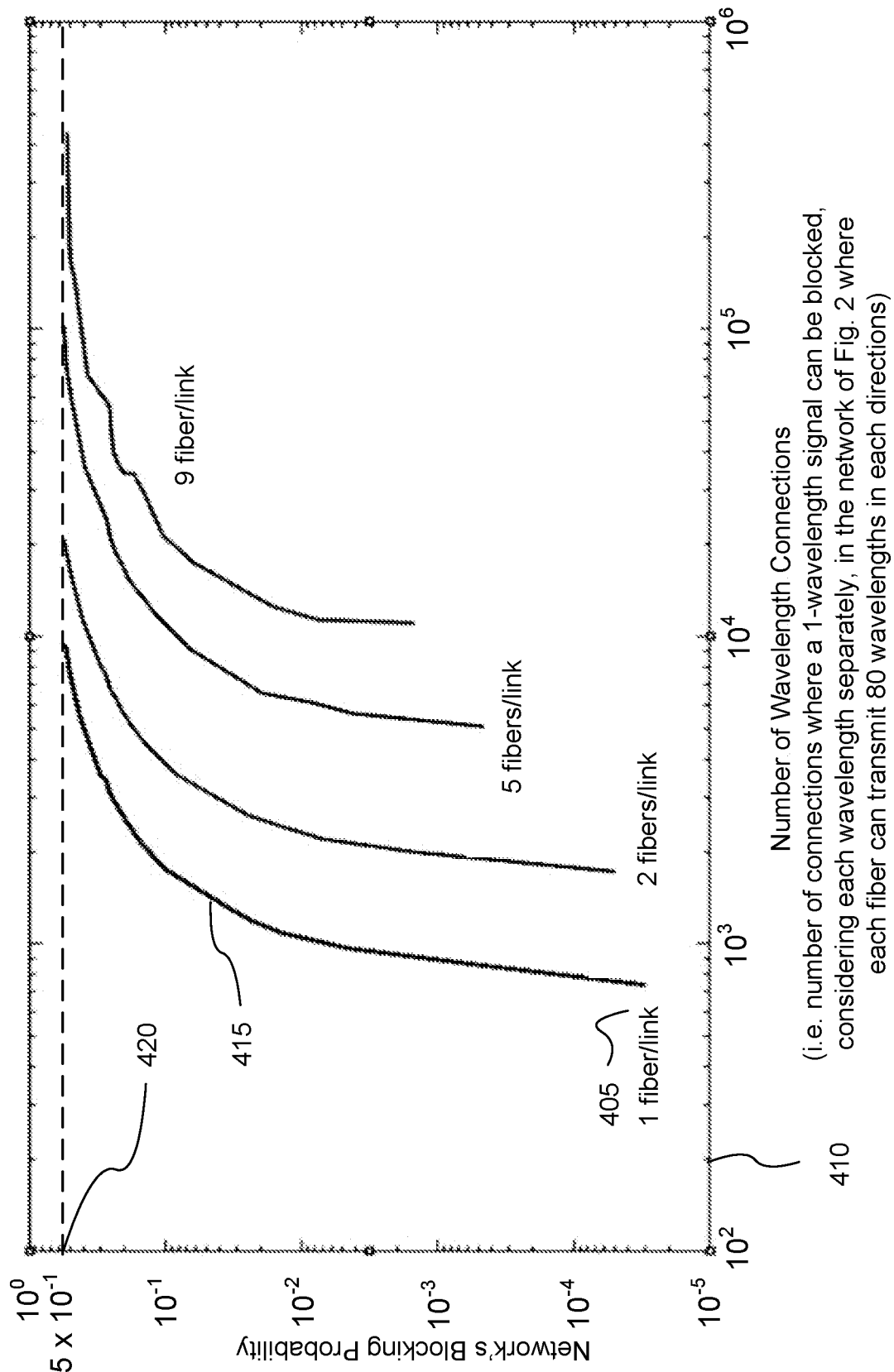
FIG. 4 is a reference graph showing the blocking probability of ROADMs, as a function of the number of wavelength connections, for links having 1, 2, 5, and 9 fibers, in a network according to an embodiment.

FIG. 4 is a reference graph showing the blocking probability of ROADMs in a network, as a function of the number of wavelength connections for links having 1, 2, 5, and 9 fibers. As traffic increases, the number of fibers per link can increases proportionally, from 1 fiber per link 405, to 2, 5, and 9 fibers per link. As the number of wavelength connections 140 increases, the blocking probability also increases 415 but reaches a maximum 420 at about 50%. With an increase in the number of fibers per link, the curve of blocking probability is shifted towards the right of the x-axis, but regardless of how many fibers per link, the maximum remains at 50%. In this case, all blockings are due to the network, and none are due to an optical cross connect (OXC), i.e., ROADM, node.

A result is that by scaling the number of fibers in a link at the same rate as traffic increases, the blocking probability is not increased or decreased (i.e., vertically). The curve is rather shifted horizontally, which allows more connections, given that an addition of fibers adds bandwidth and increases the number of add/drop transceivers. This result is consistent with results where a network blocking rate is at 50% for a high load. In embodiments, a ROADM node degree can be adjusted such that for the same total number of fibers in a network, the blocking rate can be lowered to less than 50% and utilization be increased. A degree adjustment can be made according to a method of an embodiment.

To allocate fiber capacity to ROADM nodes, a reactive approach can be used. This refers to observing each link of a network as network connections increase, and readjusting the number of fibers on the links accordingly. This can be typically performed by network planners in reaction to changes in demand, but it is often not sufficiently efficient.

Embodiments however, can be described as using a proactive approach instead of a reactive approach, as well as network knowledge-based intelligence, such as network level link utilization and routing information, in order to re-adjust network parameters. For a brownfield deployment, an embodiment can reconfigure existing fibers and ROADM resources of the network in order to optimize or maximize utilization and improve blocking performance. For a greenfield network, network planners and customers have an opportunity to optimize the network for existing traffic and to continuously upgrade it as network traffic evolves. By using a method according to an embodiment, a ROADM's degree can be optimized such as to lower the amount of blocking in the network. This amounts to an efficient allocation of fibers for improving network utilization. This can be especially useful for ROADMs and Optical Cross-connects (OXC) having a high degree. Embodiments can use network level information instead of link level information, in order to optimize ROADM degrees for OXC deployments. Methods for optimizing a ROADM's degree according to embodiments can be presented as a series of steps.

Figure 5:
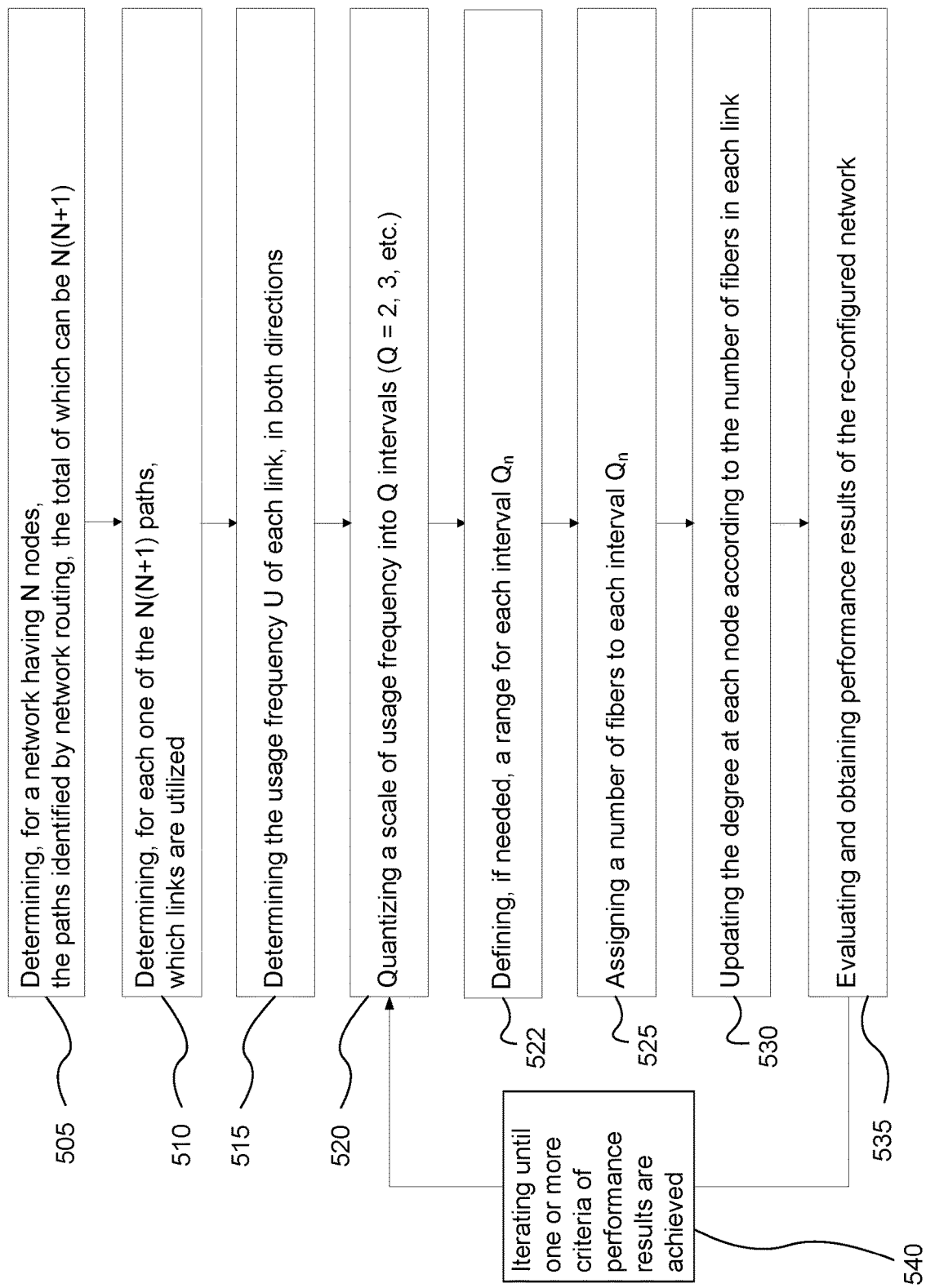
FIG. 5 is a flow chart for a method of optimizing the degree of ROADMs in a network, according to an embodiment.

FIG. 5 is a flow chart of a method for optimizing the degree of ROADMs in a network, according to an embodiment. The steps can be accomplished, for example, with a controller 170.

In an initial step, for a network of N nodes, a controller 170 can determine 505 the paths, identified by the network routing's add/drop functions, where the total number of paths can be $N*(N-1)$. In an embodiment, a routing algorithm can select a path through the nodes and links of the network for each of $N*(N-1)$ paths. The routing algorithm can use any available algorithms such as shortest path, k shortest path, A* search algorithm (A-star), etc. The selected algorithm can use one or more metrics such as the number of hops, link losses, and the optical signal-to-noise Ratio (OSNR), for one, more or many of the $N*(N-1)$ paths.

Next, for each one of the $N*(N-1)$ paths between a source and a destination, the controller 170 can determine 510 which links are utilized. This means that each link on a path connecting a source to a destination can be marked or identified. For each suitable path connecting a source and a destination, a list of links can be stored in a memory of the controller 170.

Then, the controller 170 can determine 515 the usage frequency U of each unidirectional link, when all paths are considered. In the network 202 of FIG. 2, this includes 114 unidirectional links, and $N*(N-1)$ paths. The usage frequency U of each path can be plotted on a histogram made from a scale of usage frequency and a scale of link identifiers. In other words, this step involves determining how many times each unidirectional link is used, for all the possible paths to be covered.

Once the usage frequency U of each link has been determined, a controller 170 can quantize (i.e. partition) a scale of usage frequency into Q intervals 520. For example, a scale usage frequency can be partitioned into Q=2 intervals: a first interval for usage frequency that is less than 25 (U<25), and a second interval for usage frequency of at least 25 (U≥25). In a histogram, these two intervals can be represented with the help of a horizontal line crossing the histogram's vertical axis at usage frequency U=25. Another number of intervals can also be used, such as Q=3, 4, 5, 6, 7, 8, etc. In an embodiment, a larger number Q of intervals can result in an improved network performance; however, practical considerations can limit the choice of Q. In an embodiment, a method where Q=7 can provide useful results, but embodiments also include methods wherein the value of Q is changed, iterated or incremented until the performance of a corresponding network or simulated network is acceptable.

When a scale of usage frequency is quantized or partitioned into Q intervals, a controller 170 can, if needed, define 522 a range for each interval $Q_n$ (n=1, 2, 3, etc.). In an embodiment, the intervals can have an equal range, and in other embodiments, the range of some intervals can be different from the range of other intervals. Embodiments also include methods wherein the ranges of intervals are changed, iterated or incremented until the performance of a corresponding network or simulated network is acceptable.

In some embodiments of quantization, defining a range 522 may not be necessary, as it may be included or implicit in the quantizing a scale of usage frequency 520 and in such case, the flowchart of FIG. 5 can step from quantizing the scale 520 to assigning a number of fibers to each interval $Q_n$ 525.

Once a scale of usage frequency has been quantized into Q intervals and a range has been defined, implicitly or explicitly for each interval $Q_n$, a controller 170 can assign 525 a number of fibers to each interval. In an embodiment, each interval can be associated with a number of fibers and these numbers can be readjusted as part of further iterations or fine-tuning. For instance, in an embodiment with Q=7 intervals, where each interval $Q_n$ is labeled as $Q_1$, $Q_2$, $Q_3$, $Q_4$, $Q_5$, $Q_6$ and $Q_7$, two fibers can be assigned to interval $Q_1$, eight fibers can be assigned to interval $Q_2$, nine fibers to $Q_3$, 13 fibers to $Q_4$, 14 fibers to $Q_5$ to, 17 fibers to $Q_6$, and 27 fibers to $Q_7$. However, in another embodiment, or in a further iteration of a method of a same embodiment, the number of fibers assigned to each interval Q can be refined to achieve an optimal network performance.

When a number of fibers is assigned to each interval, a number of fibers per link is also assigned, and so is a number of fiber connections for each node involved or ROADM at a termination points of the links. A controller 170 can then update 530 the degree of ROADMs located at the network nodes according to the number of fibers assigned to the links. A network can be re-configured in terms of the degree of each ROADM node and the add/drop rate of each ROADM node, by updating the degree of each ROADM node to reflect the usage frequency of its connected fibers. In an embodiment, the add/drop rate of the nodes can be 50% and the parameters to be updated can be ROADM degrees (the number of fibers in and out of ROADM).

A controller can then evaluate and obtain 535 overall performance results of the network, using the updated configuration. Based on the results, the controller 170 can iterate 540 through other numbers of intervals and/or other ranges for the intervals, and/or other numbers of fibers in each interval, until one or more criteria of performance results are achieved.

Figure 6:
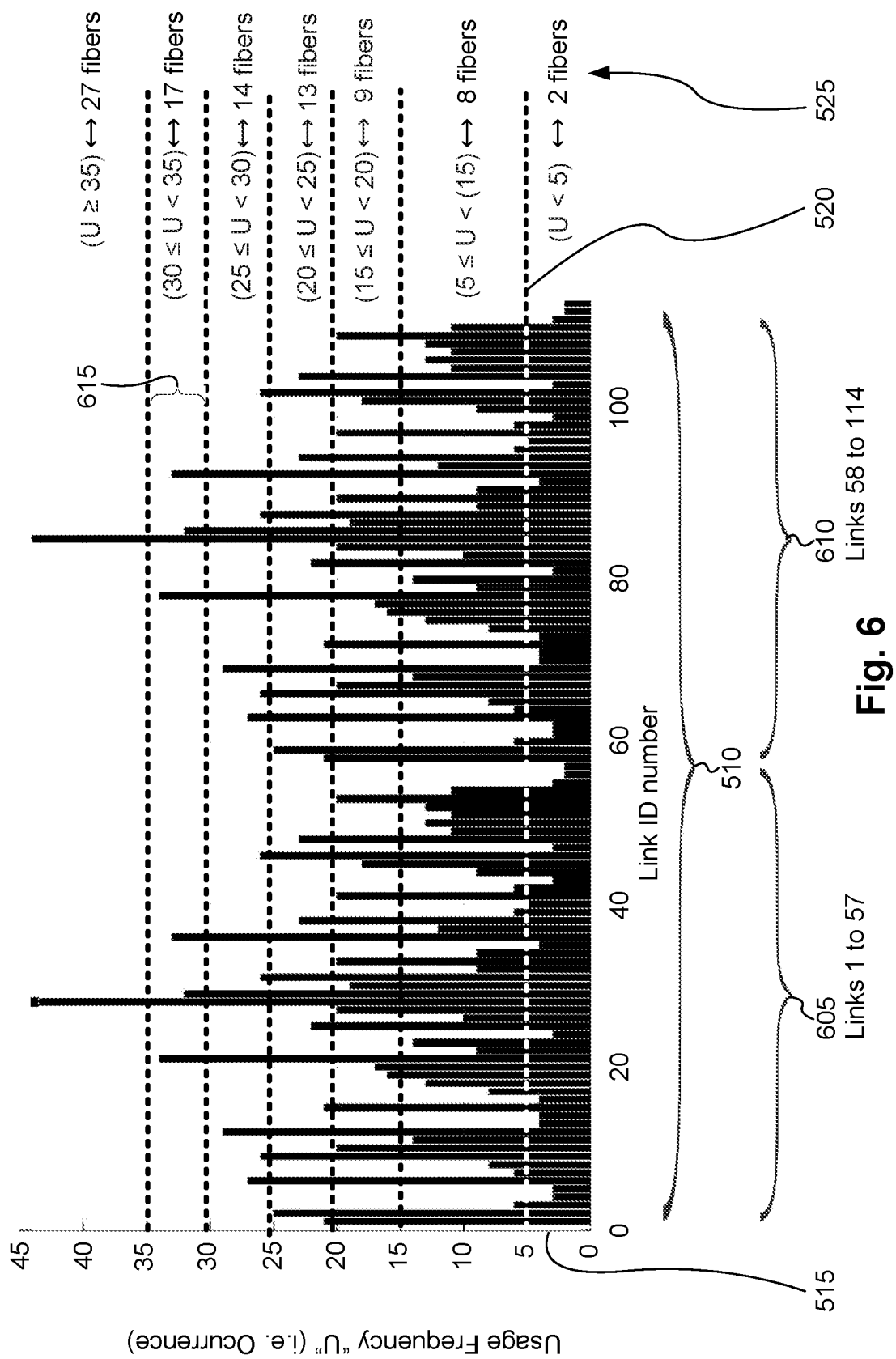
FIG. 6 is a histogram with which steps of a method to optimize the degree of ROADMs are illustrated, according to an embodiment.

FIG. 6 is a histogram with which steps of a method to optimize the degree of ROADMs are illustrated, according to an embodiment. After a controller 170 has determined 505 the paths in a network, the number of which can total N*(N−1), N being the number of nodes, it can determine and mark or identify which links are utilized 510. The links can be marked from 1 to 114, where links 1 to 57 are the physical links used in one of their directions 605, and links 58 to 114 are the same physical links when used in their opposite direction 610. Then, the controller can determine 515 a usage frequency U for each unidirectional link. The controller can then partition 520 the scale of usage frequency into Q intervals 615 and for each interval 615, it can assign 525 a number of fibers. For purposes of illustrating a simple application of a method according to an embodiment, each direction of a link can be assumed to have the same link metrics. In FIG. 6, this can be seen by noting that the utilization frequency U of link 1 is the same as U of link 57, U of link 2 is the same as U of link 58, U of link 3 is the same as U of link 59, etc., i.e. the right side of the histogram is a duplicate of the left side.

A network re-configured according to a method can be illustrated next to a table.

Figure 7:
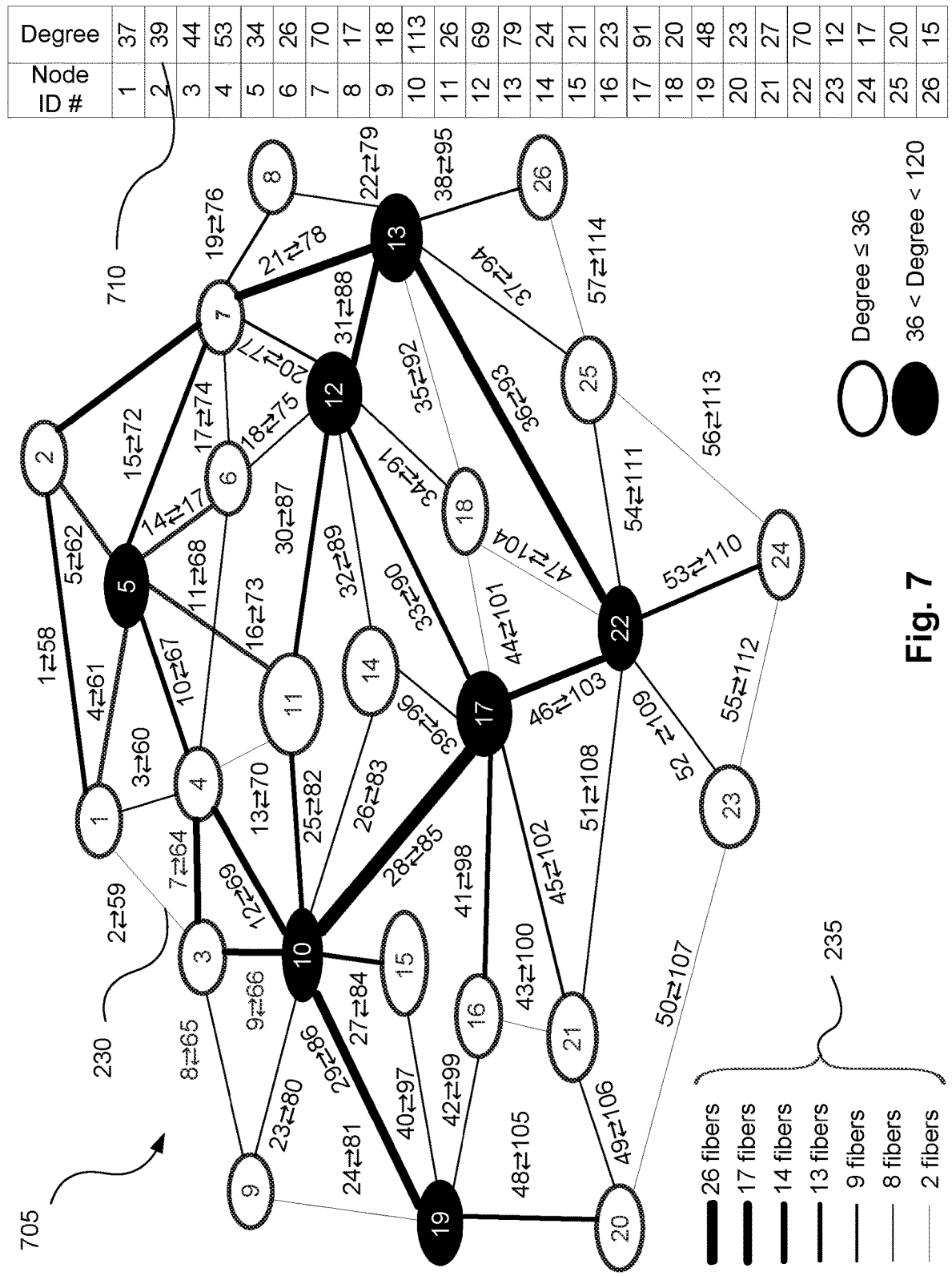
FIG. 7 illustrates a network of ROADMs, the degrees of which have been re-configured according to an embodiment.

FIG. 7 illustrates a network, re-configured according to an embodiment. After having applied steps of the method in FIG. 5 and FIG. 6, a resulting configuration can be shown as a network 705 in which the degrees of ROADM nodes 710 have been determined by the method. FIG. 7 is otherwise similar to FIG. 2; the difference being that in FIG. 2, the degree 215 is undefined, random, or selected with a method other than that of FIG. 5 or FIG. 6.

Figure 8:
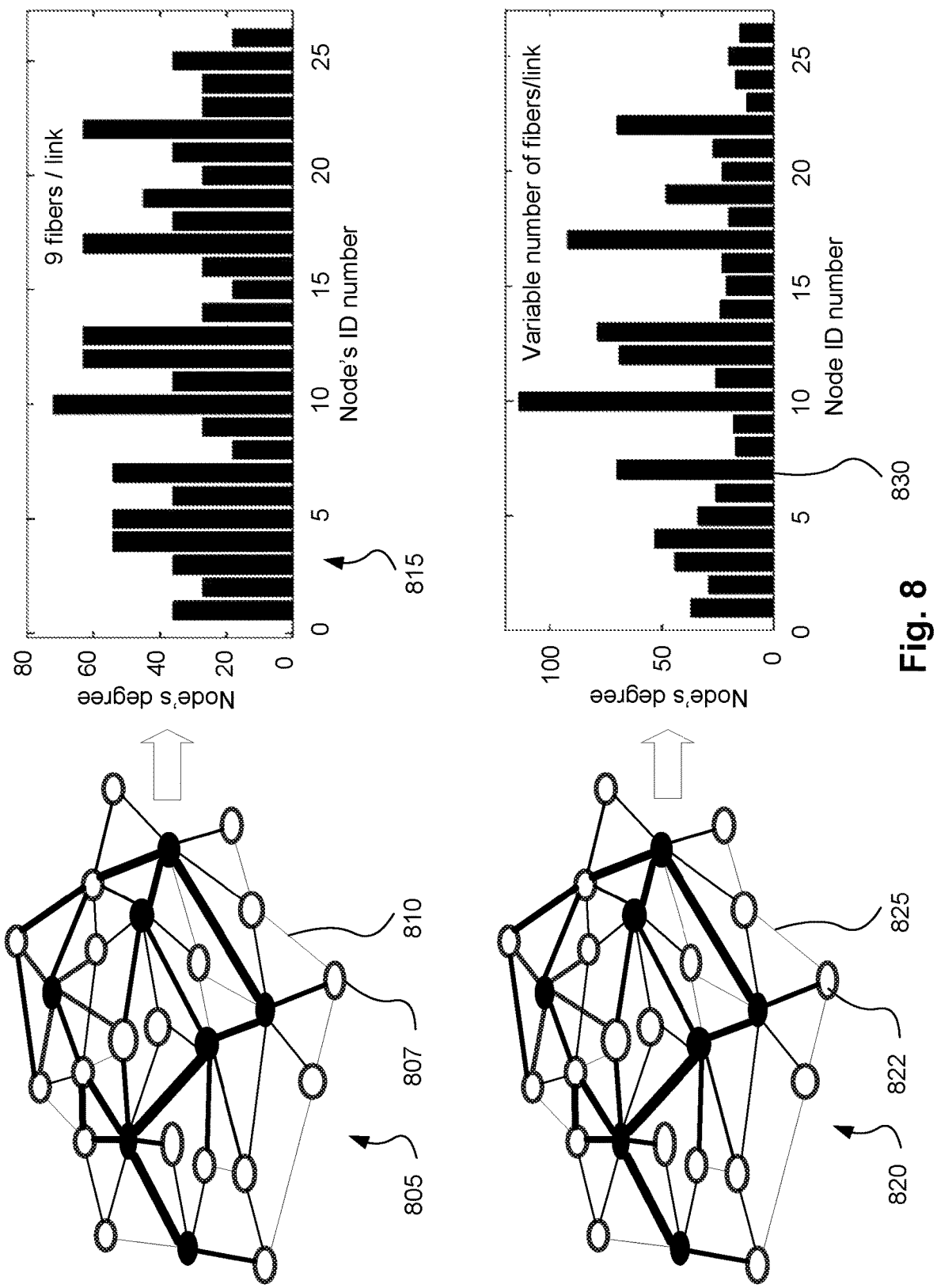
FIG. 8 illustrates a comparison between a reference network in which the number of fibers per link has been scaled with traffic, and a similar network where the number of fibers per link has been determined by applying a method according to embodiments.

FIG. 8 illustrates a comparison between a reference network in which the number of fibers per link has been scaled with traffic from 1 to 9, and a similar network where the number of fibers per link has been determined by applying a method according to embodiments. In the reference network 805, there are 26 nodes 807 and each link 810 includes 9 fibers. This corresponds to each node having a degree as shown in a first histogram 815. The second network 820 has the same number (26) of nodes 822 as the first network, and they are linked to each other in the same way, except that the number of fibers in each link 825 has been determined by a method according to an embodiment. A second histogram 830 shows the corresponding degree for each node 822. Both networks have 513 fibers over 57 bidirectional links or 1026 fibers over 114 unidirectional links.

In an embodiment, a fiber can carry a predetermined number of wavelengths, such as 80 wavelengths, and such a fiber can be said to include 80 wavelength connections at each extremity. Similarly, a path including a series of fibers and nodes can also be said to include a number of wavelength connections, as if it were one fiber. Each wavelength connection can start from an add port of a source ROADM node, and connect to a drop port of a destination ROADM node, such as to follow a path.

In an embodiment of performance modeling, a wavelength connection can be chosen randomly, two end nodes of a network can be chosen randomly, and a path between these two end nodes can be selected according to its metrics and a routing algorithm. Further paths between these two end nodes can also be chosen similarly, as well as further end nodes, and further paths between the further end nodes, and so on. Each path can be said to have a corresponding length, based on the length of its fibers and properties of the nodes involved.

In an embodiment, to model the performance of a re-configured network, the arrival of a wavelength connection request can be random and can follow a Poisson process. The period of time during which each connection uses network resources (e.g., a wavelength) can be random and follow an exponential or a Pareto distribution. Path destinations can be selected with a uniform distribution, and routing can be used to select a path and a wavelength through the network. In performance modeling, a routing can be a shortest path and routing metrics can be hop-based, whereas wavelength selection can be based on a first-fit, meaning that the first wavelength that is available on all of the links of a path can be chosen.

Figure 9:
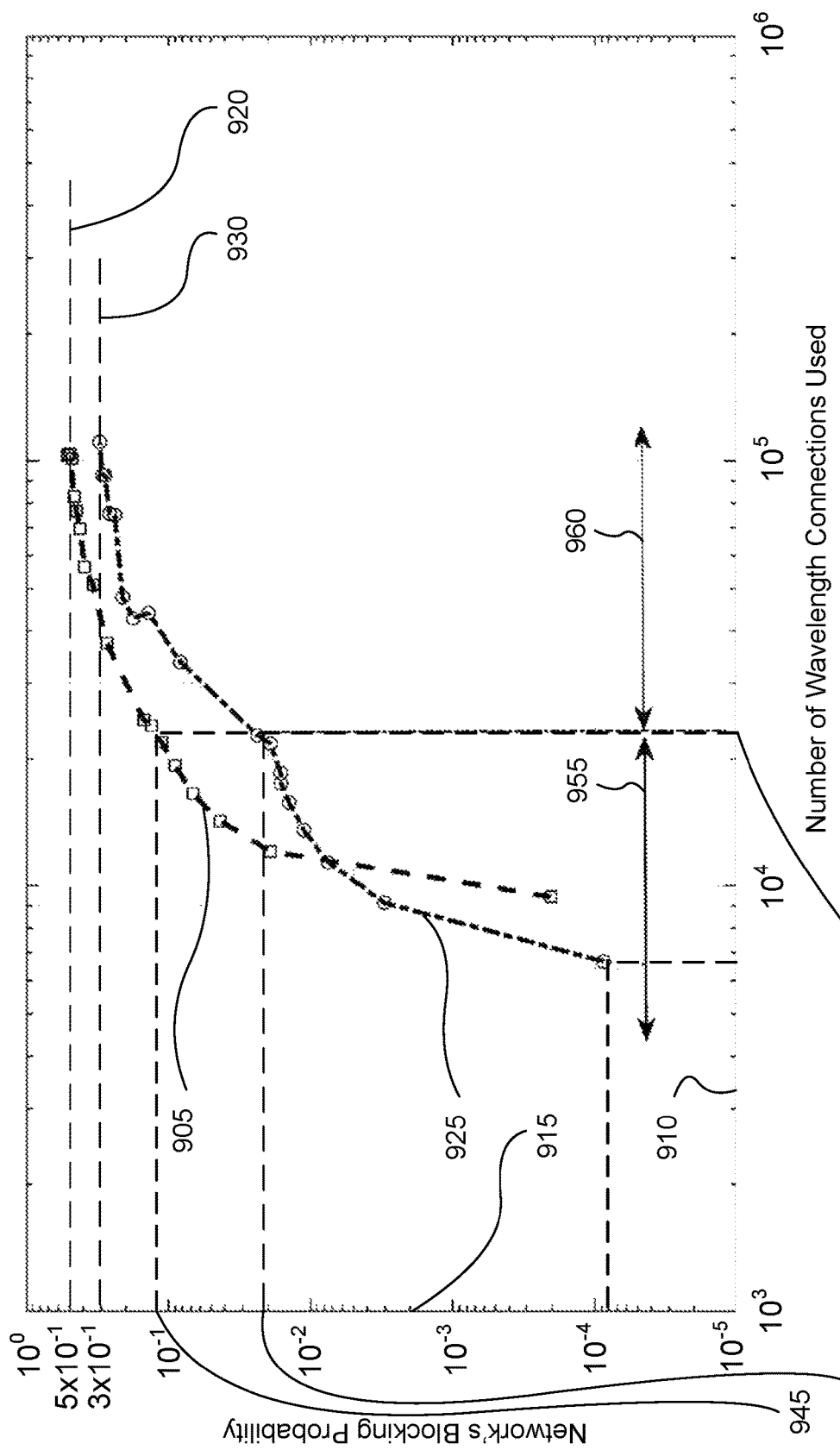
FIG. 9 is a graph comparing the blocking rate of a reference network where each link has a fixed number of fibers, and the blocking rate of a network where the number of fibers in each link has been determined with a method according to an embodiment.

FIG. 9 is a graph comparing the blocking rate of a reference network where each link has a fixed number of fibers, and the blocking rate of a network where the number of fibers in each link has been determined with a method according to an embodiment. For the reference network's curve 905, as the number of wavelength connections 910 used is increased, so does the probability of network blocking 915, until a maximum of approximately 50% is reached 920. For the optimized network, the curve's 925 blocking rate is less overall, with a maximum that is around 30% on the graph 930. The network optimized with an embodiment therefore allows less blocking.

The graph in FIG. 9 also shows that when the number of wavelength connections used represents a 100% load 935, the blocking probability 940 for an embodiment is 0.025, which is much less at 0.12 than it is 945 for the reference curve. Generally, for both underload 955 and overload 960 situations, the blocking probability is less for an embodiment 925 than it is for the reference curve 905. In practice, a better performance in terms of blocking probability can be translated to a better utilization of a network's wavelength resources.

Figure 10A:
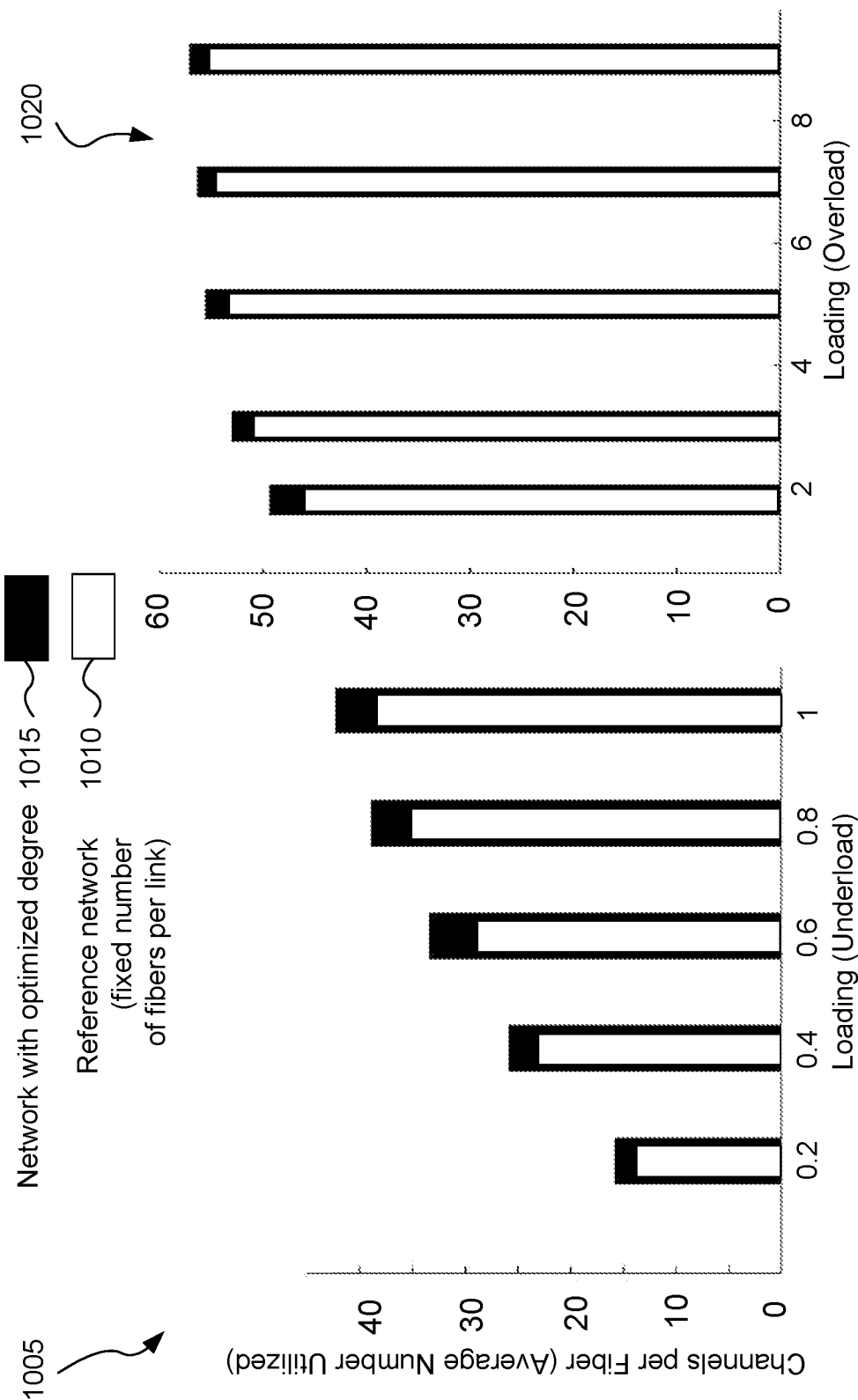
FIG. 10a shows bar graphs representing the utilization performance of a reference network and that of a network to which a method according to an embodiment has been applied.

FIG. 10a shows bar graphs representing the utilization performance of a reference network and that of a network re-configured according to an embodiment. In underloading conditions 1005, a network optimized according to an embodiment 1015, with Q=7 intervals, shows a utilization frequency of approximately 10% over that of a reference network 1010. The same can be said with overloading conditions 1020. The use of Q=7 intervals however, can be sub-optimal. With further partitioning, i.e. by increasing the number Q of intervals 615, network utilization can be optimized because fiber allocations at each interval can result in improved efficiencies. Modifying the range of each interval and the number of fibers assigned to each interval can also allow optimizations.

A method according to embodiments can be used by operators to re-configure an existing network in order to better utilize existing network resources.

Information required for improving a network configuration can be obtained from many sources or from a variety of ways. Such information can be obtained from a path computation element (PCE) located at one or more nodes of the network, a network management station, or a dedicated computational platform. A PCE can include two key elements: first, a photonic layer impairment (PLI) module, and second, depending on whether a network is a fixed grid or a flex grid network, a routing and wavelength assignment (RWA) module or a routing and spectrum assignment (RSA) module. The routing part of an RWA or RSA module can use a routing scheme and a wavelength/spectrum assignment part can use one of many assignment algorithms such as a first fit or a most-used etc. scheme.

Figure 10B:
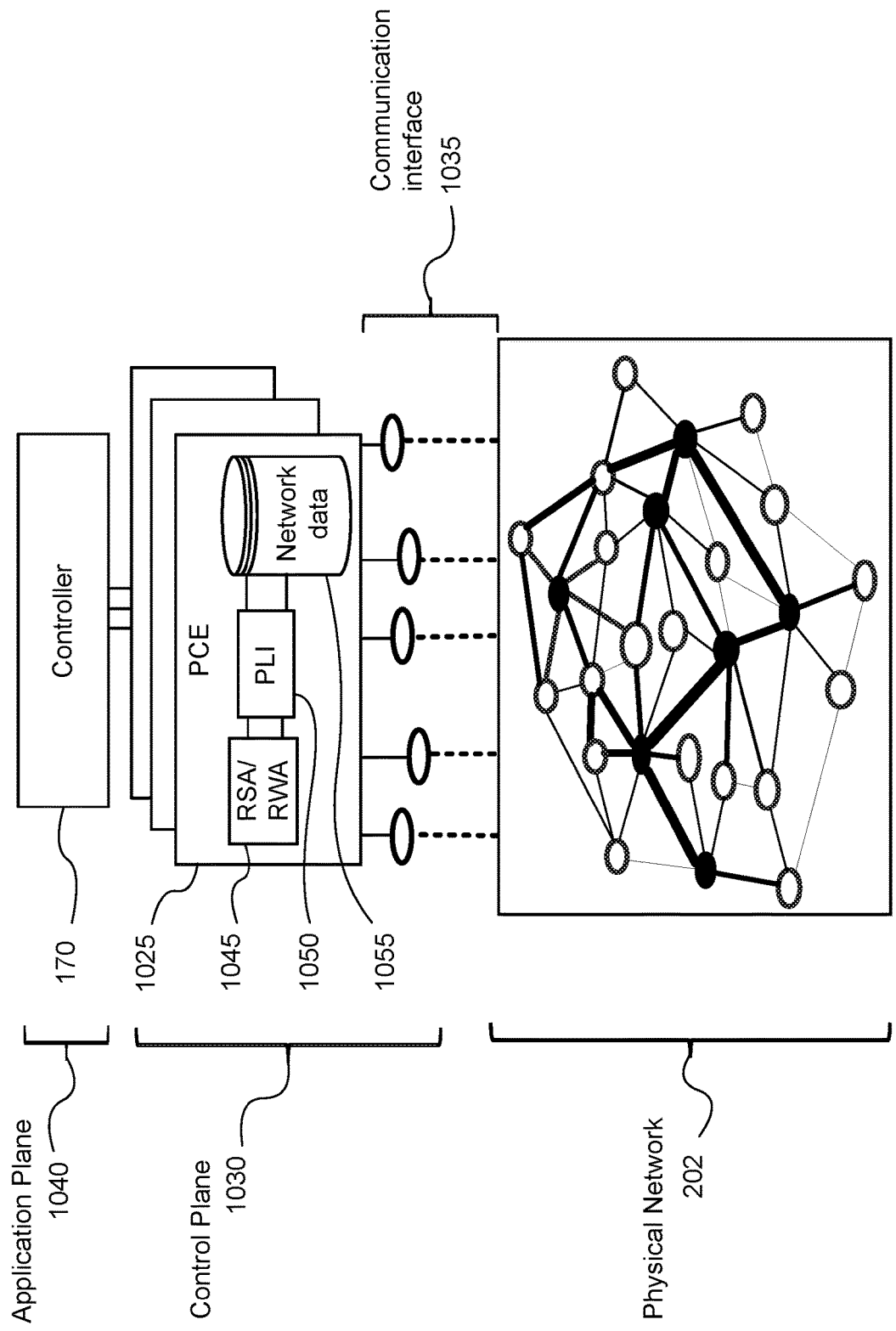
FIG. 10b illustrates how a path computation element (PCE) can be used to provide parameters of a physical network to a controller according to embodiments.

FIG. 10b illustrates how a path computation element (PCE) can be used to provide parameters of a physical network to a controller according to embodiments. A PCE 1025 can be at the control plane 1030 of a physical network 202, obtain information from it via a communication interface 1035, and provide it to a controller 170 implementing methods of the present disclosure at an application plane 1040. A PCE 1025 can perform orchestration and include a module to perform routing and spectrum assignments (RSA) and/or routing and wavelength assignments (RWA) 1045, a module to recognize photonic layer impairment (PLI) 1050, and a database for network parameters and data 1055.

In embodiments, information for re-configuration can be obtained or derived from routing constraints, a network's link budget, physical constraints of the links, and/or other sets of parameters.

Embodiments can be used as a re-planning tool to design networks equipped with high degree ROADMs and/or ROADM cluster nodes.

Embodiments can be used to optimize the number of fibers on the links of a network in which the number of fibers on links can be varied.

Embodiments can be used to improve the performance of a network, and in particular to decrease the amount or probability of networking blocking. This in turn can allow improved utilization of available network resources.

Embodiments can be part of a network planning tool that can be deployed by vendors and/or customers to better configure a network.

Embodiments can be used to optimize an existing network, and in particular a network having links that include many fibers. This can allow better utilization of the network resources, such as wavelengths or wavelength connections.

Embodiments can be used to allow an existing network to expand while remaining free from disruptions. A network expansion can be implemented by adding a new WSS in a chassis to increase the degree of a ROADM, or by adding a chassis to a cluster of ROADMs, without impacting existing connections.

Embodiments include methods of using information and parameters describing a network, to configure or re-configure the degrees of one or more ROADMs at nodes of the network.

Information and parameters used to implement methods according to embodiments can be derived from network level link utilization and/or routing information.

Information and parameters used to implement methods according to embodiments can be derived from physical parameters and link budget.

In embodiments, network level link utilization and/or routing information can include the utilization frequency of one or more links.

In embodiments, the utilization frequency U of a link can be partitioned into a number Q of intervals. In an embodiment, the total number Q of intervals can be varied between Q=2, Q=3, Q=4, Q=6, Q=7, Q=8, etc.; for any number Q of intervals, the individual intervals can be labelled as $Q_n=Q_1$, $Q_2$, etc.; and a number of fibers can be assigned to each utilization interval $Q_n$.

A network's performance can be evaluated for any number Q of intervals, and a number Q of intervals for which respective numbers of associated fibers result in a satisfactory network performance can be selected.

In embodiments, the utilization frequency U for links can be represented on a histogram and intervals $Q_n$ for a selected number Q of intervals can be represented on a y-axis scale of that histogram.

In embodiments, physical parameters of a network link can include optical signal-to-noise-ratio (OSNR), physical medium dependent (PMD) parameters, polarization mode dispersion parameters (PMD), differential group delay (DGD) parameters, polarization loss (PDL) parameters, and cross-phase modulation (XPM) parameters. Such parameters can be obtained for one or more links of a network, and in some embodiments, parameters can be obtained for all the links of a network. Parameter information can be obtained from a path computation element (PCE) located at one or more nodes of the network, a network management station, or a dedicated computational platform.

In embodiments, the number Q of intervals can be determined off-line to obtain an optimal performance.

Embodiments include a method, at the control plane of an optical network, to optimize optical network resources by proactively selecting or recommending a degree for ROADM nodes, that would allow an improved capacity of the links and therefore of the network as a whole.

Figure 11:
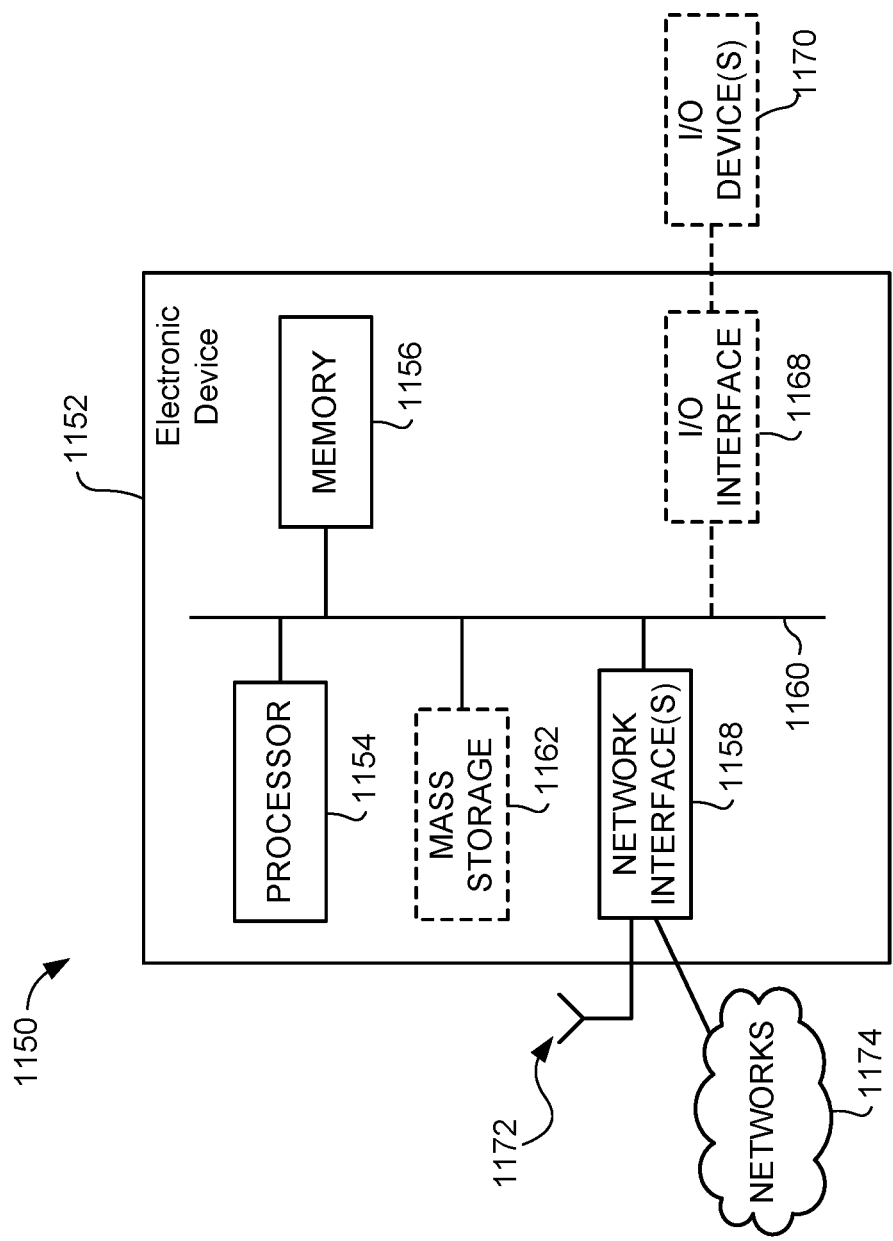
FIG. 11 is a block diagram of an electronic device within a computing and communications environment that may be used for implementing devices and methods in accordance with representative embodiments of the present disclosure, according to embodiments.

FIG. 11 is a block diagram of an electronic device (ED) 1152 illustrated within a computing and communications environment 1150 that may be used for implementing the devices and methods disclosed herein, such as a controller 170. The electronic device 1152 typically includes a processor 1154, such as a central processing unit (CPU), and may further include specialized processors such as a field programmable gate array (FPGA) or other such processor, a memory 1156, a network interface 1158 and a bus 1160 to connect the components of ED 1152. ED 1152 may optionally also include components such as a mass storage device 1162, a video adapter 1164, and an I/O interface 1168

(shown in dashed lines). An ED 1152 according to an embodiment can also include a cache.

The memory 1156 may comprise any type of non-transitory system memory, readable by the processor 1154, such as static random-access memory (SRAM), dynamic random-access memory (DRAM), synchronous DRAM (SDRAM), read-only memory (ROM), or a combination thereof. In an embodiment, the memory 1156 may include more than one type of memory, such as ROM for use at boot-up, and DRAM for program and data storage for use while executing programs. The bus 1160 may be one or more of any type of several bus architectures including a memory bus or memory controller, a peripheral bus, or a video bus.

The electronic device 1152 may also include one or more network interfaces 1158, which may include at least one of a wired network interface and a wireless network interface. A network interface 1158 may include a wired network interface to connect to a network 1174, and also may include a radio access network interface 1172 for connecting to other devices over a radio link. The network interfaces 1158 allow the electronic device 1152 to communicate with remote entities such as those connected to network 1174.

The mass storage 1162 may comprise any type of non-transitory storage device configured to store data, programs, and other information and to make the data, programs, and other information accessible via the bus 1160. The mass storage 1162 may comprise, for example, one or more of a solid-state drive, hard disk drive, a magnetic disk drive, or an optical disk drive. In some embodiments, mass storage 1162 may be remote to the electronic device 1152 and accessible through use of a network interface such as interface 1158. In the illustrated embodiment, mass storage 1162 is distinct from memory 1156 where it is included and may generally perform storage tasks compatible with higher latency, but may generally provide lesser or no volatility. In some embodiments, mass storage 1162 may be integrated with a heterogeneous memory 1156.

In some embodiments, electronic device 1152 may be a standalone device, while in other embodiments electronic device 1152 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

In embodiments, an electronic device 1152 can be connected to network nodes for processing, storing and/or receiving signals and signal parameters. It can be used to determine which links are utilized and the usage frequency of links, based on network level link utilization and routing information. It can also be used to determine such information based on a link budget and one or more physical parameters, such as an optical signal-to-noise-ratio (OSNR), physical medium dependent (PMD) parameters, polarization mode dispersion parameters (PMD), differential group delay (DGD) parameters, polarization loss (PDL) parameters, and cross-phase modulation (XPM) parameters. A memory 1156 can be used for storing any of the above information. It can also contain tables containing values for fiber, ROADM and network parameters, as well as software for simulating an optical network in operation. The electronic device can be operative to process information from the memory, in order to perform network simulations and optimizations, to obtain performance results, and possibly to obtain an optimized number of intervals on a scale of usage frequency, a range for one or more intervals, and a number of fibers assigned to each interval. Such numbers can be obtained following iterative processes based on results from simulating an optical network in operation. A network interface 1158 can be used at any node, for communicating results to a processor 1154 operative to perform calculations required by embodiments. Inputs and outputs for calculations can be provided by, and to, a memory 1156, network interfaces 1174, and I/O interfaces 1168.

Embodiments include a method of optimizing a network's efficiency with a network controller, comprising: determining for each path of the network, which links are utilized; determining for each utilized link, the link's usage frequency in at least one direction; quantizing a scale of link usage frequency into a number of intervals; and assigning to each interval a number of fibers.

In embodiments, quantizing a scale of link usage frequency into a number of intervals can include partitioning the scale of link usage frequency into a number of intervals, and assigning a range to each interval.

In embodiments, assigning to each interval a number of fibers can result in assigning a number of fibers to each utilized link, and assigning a number of fiber connections to one or more utilized reconfigurable optical add-drop multiplexers (ROADM) located at respective nodes of the network.

In embodiments, updating in a network the numbers of fiber connections of ROADMs, can be performed according to the numbers of fiber connections they have been assigned; and evaluating performance results of the network having ROADMs with updated numbers of fiber connections.

In embodiments, a network can be a simulated network.

In embodiments, a method can include iterating the quantizing of a scale of link usage frequency into a number of intervals, until one or more criteria of performance results are achieved.

In embodiments, a method can further include iterating the assigning to each interval a number of fibers, until one or more criteria of performance results are achieved.

In embodiments, a method can further include iterating the partitioning of the scale of link usage frequency into a number of intervals, and the assigning of a range to each interval, until one or more criteria of performance results are achieved.

In embodiments, assigning to each interval a number of fibers can be based on iterating the quantizing of a scale of link usage frequency into a number of intervals, and on one or more criteria of performance results being achieved.

In embodiments, the performance results can include a blocking rate representing an overall signal blocking rate of the network, and the one or more criteria can include the blocking rate.

In embodiments, the ranges of intervals can be equal.

In embodiments, the range of at least one interval can be different than the range of another interval.

In embodiments, determining which links are utilized, and determining the link's usage frequency can be based on network level link utilization and routing information.

In embodiments, determining which links are utilized, and determining the link's usage frequency can be based on one or more physical parameters and a link budget.

In embodiments, a physical parameter can be one of: an optical signal-to-noise-ratio (OSNR), a physical medium dependent (PMD) parameter, a polarization mode dispersion parameter (PMD), a differential group delay (DGD) parameter, a polarization loss (PDL) parameter, and a cross-phase modulation (XPM) parameter.

In embodiments, quantizing a scale of link usage frequency into a number of intervals can be performed offline.

Embodiments include a system for optimizing the efficiency of an optical network comprising a controller operative to determine for each path of the network, which links are utilized; determine for each utilized link, the link's usage frequency in at least one direction; quantize a scale of link usage frequency into a number of intervals; and assign to each interval, a number of fibers.

In embodiments, a system can further include one or more reconfigurable optical add-drop multiplexers (ROADM) located at respective nodes of the network, and a controller can be further operative to assign a number of fibers to each utilized link, and assign a number of fiber connections to one of more utilized ROADMs; based on the number of fibers assigned to each interval.

In embodiments, at least one reconfigurable ROADM can be operative to have its degree updated by changing how many wavelength selective switches (WSS) it contains.

In embodiments, a system can further include a simulated optical network, and a controller can be further operative to update the degrees of ROADMs in the simulated optical network, based on the number of fibers assigned to the utilized links.

In embodiments, a controller can be further operative to evaluate performance results of the network in which the degree of at least one ROADM has been updated.

In embodiments, a controller can be further operative to iterate the quantizing of a scale of link usage frequency into a number of intervals, until one or more criteria of performance results are achieved.

In embodiments, a controller can be further operative to iterate the range of one of more intervals until one or more criteria of performance results are achieved.

In embodiments, a controller can be further operative to iterate the assignment to each interval, of a number of fibers until one or more criteria of performance results are achieved.

In embodiments, a controller can be further operative to select the number of intervals, and the numbers of fibers, based on iterations until one or more criteria of performance results are achieved.

In embodiments performance results can include a blocking rate representing an overall signal blocking rate of the network.

In embodiments, a controller can be further operative to determine which links are utilized and to determine the link's usage frequencies, based on network level link utilization and routing information.

In embodiments, a controller can be further operative to determine which links are utilized and to determine the link's usage frequencies, based on one or more physical parameters and a link budget.

In embodiment, a physical parameter can be one of an optical signal-to-noise-ratio (OSNR), a physical medium dependent (PMD) parameter, a polarization mode dispersion parameter (PMD), a differential group delay (DGD) parameter, a polarization loss (PDL) parameter, and a cross-phase modulation (XPM) parameter.

In embodiments, partitioning a scale of link usage frequency into a number of intervals can be performed offline.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of optimizing an efficiency of a network, the network including one or more links and a plurality of nodes each coupled to one or more other nodes of the plurality of nodes by a corresponding link of the one or more links, each pair of nodes of the plurality of nodes having one or more paths therebetween, each path including at least one link of the one or more links each configured to propagate a signal in either of two directions, each direction of the two directions being associated with a respective utilization frequency, the method comprising:
   determining, for each path of the one or more paths, which of the respective at least one link of the one or more links are utilized, to obtain a plurality of utilized links, the plurality of utilized links being links with a utilization frequency greater than zero over a period of time;
   determining, for each utilized link of the plurality of utilized links in at least one direction of the two directions, over the period of time, the associated utilization frequency;
   partitioning a scale of link utilization frequency into a plurality of intervals;
   categorizing each utilized link of the plurality of utilized links as belonging to one of the plurality of intervals according to the associated utilization frequency of the respective utilized link;
   assigning to each interval a respective one or more fibers; and
   re-configuring at least one link of the one or more links according to the one or more fibers assigned to the interval of the respective at least one link.

2. The method of claim 1, wherein partitioning the scale of link utilization frequency into the plurality of intervals comprises:
   assigning a respective range of link utilization frequencies to each interval.

3. The method of claim 1, wherein:
   the network includes one or more utilized reconfigurable optical add-drop multiplexers (ROADMs) each located at a respective node of the plurality of nodes and coupled to the one or more links of the respective node through one or more respective fiber connections, at least one of the one or more links of the respective node being a utilized link; and assigning to each interval the respective one or more fibers results in:
- assigning the respective one or more fibers to each utilized link of the plurality of utilized links; and
- assigning a respective one or more fiber connections to each utilized ROADM of the one or more utilized ROADMs.

4. The method of claim 3, wherein re-configuring the at least one link of the one or more links according to the one or more fibers assigned to the interval of the respective at least one link includes:
updating a number of the respective one or more fiber connections of each utilized ROADM according to the respective one or more fiber connections that have been assigned; and
evaluating one or more performance results of the network.

5. The method of claim 4, wherein the network is a simulated network.

6. The method of claim 4, further comprising iterating the partitioning of the scale of link utilization frequency into the plurality of intervals, until one or more criteria of the one or more performance results are achieved.

7. The method of claim 4, further comprising iterating the assigning to each interval the respective one or more fibers, until one or more criteria of the one or more performance results are achieved.

8. The method of claim 6, wherein assigning to each interval the respective one or more fibers is based on iterating the partitioning of the scale of link utilization frequency into the plurality of intervals, and on the one or more criteria of the one or more performance results being achieved.

9. The method of claim 8, wherein the one or more performance results include a blocking rate representing an overall signal blocking rate of the network, and the one or more criteria include the blocking rate.

10. The method of claim 1, wherein:
determining, for each path of the one or more paths, which of the respective at least one link of the one or more links are utilized is based on network level link utilization and routing information; and
determining, for each utilized link of the plurality of utilized links in the at least one direction of the two directions, over the period of time, the associated utilization frequency is based on network level link utilization and routing information.

11. The method of claim 1, wherein:
determining, for each path of the one or more paths, which of the respective at least one link of the one or more links are utilized links is based on one or more physical parameters and a link budget; and
determining, for each utilized link of the plurality of utilized links in the at least one direction of the two directions, over the period of time, the associated usage frequency is based on the one or more physical parameters and the link budget.

12. The method of claim 11, wherein at least one physical parameter of the one or more physical parameters is one of:
an optical signal-to-noise-ratio (OSNR),
a physical medium dependent (PMD) parameter,
a polarization mode dispersion parameter (PMD),
a differential group delay (DGD) parameter,
a polarization loss (PDL) parameter, and
a cross-phase modulation (XPM) parameter.

13. A system for optimizing the efficiency of an optical network, the optical network including one or more links and a plurality of nodes each coupled to one or more other nodes of the plurality of nodes by a corresponding link of the one or more links, each pair of nodes of the plurality of nodes having one or more paths therebetween, each path including at least one link of the one or more links each configured to propagate a signal in either of two directions, each direction of the two directions being associated with a respective utilization frequency, the system comprising:
a controller operative to:
determine, for each path of the one or more paths, which of the respective at least one link of the one or more links are utilized, to obtain a plurality of utilized links, the plurality of utilized links being links with a utilization frequency greater than zero over a period of time;
determine, for each utilized link of the plurality of utilized links in at least one direction of the two directions over the period of time, the associated utilization frequency;
partition a scale of link utilization frequency into a plurality of intervals;
categorize each utilized link of the plurality of utilized links as belonging to one of the plurality of intervals according to the associated utilization frequency of the respective utilized link; and
assign to each interval a respective one or more fibers.

14. The system of claim 13, wherein:
the system further comprises one or more utilized reconfigurable optical add-drop multiplexers (ROADMs) each located at a respective node of the plurality of nodes and coupled to the one or more links of the respective node through a respective number of fiber connections, at least one of the one or more links of the respective node being utilized; and
the controller is further operative to:
assign the respective one or more fibers to each utilized link of the plurality of utilized links based on the respective one or more fibers assigned to each interval, and
assign a respective one or more fiber connections to each utilized ROADM of the one or more utilized ROADMs based on the respective one or more fibers assigned to each interval.

15. The system of claim 14, wherein:
each utilized ROADM has an associated degree and is configured to contain an associated number of wavelength selective switches (WSSs), the number being a positive integer; and
at least one utilized ROADM is operative to have the associated degree updated by having the number of associated WSSs changed.

16. The system of claim 15, wherein the controller is further operative to evaluate one or more performance results of the optical network when the associated degree has been updated.

17. The system of claim 16, wherein the controller is further operative to iterate a partitioning of the scale of link utilization frequency into the plurality of intervals, until one or more criteria of the one or more performance results are achieved.

18. The system of claim 16, wherein the controller is further operative to iterate assigning a range of link utilization frequencies to the one of more intervals of the plurality of intervals, until one or more criteria of the one or more performance results are achieved.

19. The system of claim 16, wherein the controller is further operative to iterate the assigning to each interval the respective one or more fibers, until one or more criteria of the one or more performance results are achieved.

20. The system of claim 16, wherein the controller is further operative to:
   select the plurality of intervals, and select the respective one or more fibers for each interval.

21. The system of claim 16, wherein the one or more performance results includes a blocking rate representing an overall signal blocking rate of the optical network.

* * * * *